US010112131B2

(12) United States Patent
Yoon et al.

(10) Patent No.: US 10,112,131 B2
(45) Date of Patent: Oct. 30, 2018

(54) WASTE SCREENING APPARATUS (71) Applicant: Essa corp., Gyeongju-si (KR)

(72) Inventors: Young Nae Yoon, Gyeongju-si (KR); Youn Ho Lee, Gyeongju-si (KR); Young Ik Choi, Gimhae-si (KR); Hee Jong Jung, Gyeongju-si (KR); Mi Hwa Kim, Gyeongju-si (KR)

(73) Assignee: ESSA CORP., Gyeongju-si (KR)

( * ) Notice: Subject to any disclaimer, the term of this patent is extended or adjusted under 35 U.S.C. 154(b) by 30 days.

(21) Appl. No.: 15/411,825

(22) Filed: Jan. 20, 2017

(65) Prior Publication Data
US 2017/0246564 A1 Aug. 31, 2017

(30) Foreign Application Priority Data

Feb. 25, 2016 (KR) .................. 10-2016-0022646

(51) Int. Cl.
*B01D 33/04* (2006.01)
*E02B 8/02* (2006.01)
(Continued)

(52) U.S. Cl.
CPC ......... *B01D 33/76* (2013.01); *B01D 33/0058* (2013.01); *B01D 33/0087* (2013.01);
(Continued)

(58) Field of Classification Search
CPC ..... E02B 8/023; E02B 8/026; B01D 33/0058; B01D 33/0087; B01D 33/04; B01D 33/056; B01D 33/333; B01D 33/461; E03F 5/14
(Continued)

(56) References Cited

U.S. PATENT DOCUMENTS

| 4,188,294 A | * | 2/1980 | Hagihara | ............... | B01D 33/04 |
| | | | | | 210/160 |
| 4,374,736 A | * | 2/1983 | Jackson | ................. | B01D 33/04 |
| | | | | | 210/160 |

(Continued)

FOREIGN PATENT DOCUMENTS

| FR | 577255 | * | 9/1924 |
| JP | 2008-190176 A | | 8/2008 |

(Continued)

OTHER PUBLICATIONS

Machine translation of FR 577255, Sep. 1924.*

*Primary Examiner* — Christopher Upton
(74) *Attorney, Agent, or Firm* — KORUS Patent, LLC; Seong Il Jeong (57) ABSTRACT The present discloses a waste screening apparatus comprising: a main body; a waste screener vertically and tiltedly disposed in the main body to screen wastes in the input water and to allow waste-removed water to be discharged through water discharge holes defined in both side faces of the main body respectively, wherein the waste screener vertically circulates in a conveyor manner, wherein the input water is input to a front, rear and bottom of the waste screener; wherein the main body includes: both side walls having the water discharge holes defined therein respectively to allow waste-removed water to be discharged out from the waste screener therethrough; and a rear blocking wall disposed at a rear of the waste screener to be spaced from the waste screener, wherein the input water passes through front and rear portions of the waste screener with wastes being removed from the input water, and, then, is discharged out through the water discharge holes defined in the both side walls respectively.

11 Claims, 7 Drawing Sheets (51) Int. Cl.
*B01D 33/76* (2006.01)
*B01D 33/00* (2006.01)
*B01D 33/46* (2006.01)
*B01D 33/80* (2006.01)
*C02F 1/00* (2006.01)

(52) U.S. Cl.
CPC ........... *B01D 33/04* (2013.01); *B01D 33/461* (2013.01); *B01D 33/801* (2013.01); *C02F 1/001* (2013.01); *E02B 8/026* (2013.01)

(58) Field of Classification Search
USPC ................ 210/158, 159, 160, 161, 391, 400
See application file for complete search history.

(56) References Cited

U.S. PATENT DOCUMENTS

| | | | | |
|---|---|---|---|---|
| 4,892,652 A | * | 1/1990 | Rudy | B01D 33/333 210/160 |
| 5,565,093 A | * | 10/1996 | Frankenberger | B01D 33/333 210/158 |
| 5,676,829 A | * | 10/1997 | Cotterill | B01D 33/04 210/158 |
| 5,800,701 A | * | 9/1998 | Larsen | B01D 33/333 210/158 |
| 6,280,612 B1 | * | 8/2001 | Kroos | B01D 33/04 210/158 |
| 8,500,997 B2 | * | 8/2013 | Grammelsberger | B01D 33/04 210/158 |
| 2005/0016908 A1 | * | 1/2005 | Kerl | E02B 8/026 210/158 |
| 2007/0215532 A1 | * | 9/2007 | Wunsch | B01D 33/056 210/160 |

FOREIGN PATENT DOCUMENTS

| | | |
|---|---|---|
| KR | 20-0244906 Y1 | 9/2001 |
| KR | 10-0642815 B1 | 11/2006 |
| KR | 10-0941622 B1 | 2/2010 |
| KR | 10-1177922 B1 | 8/2012 |
| KR | 10-1415953 B1 | 7/2014 |

\* cited by examiner

Prior Art

FIG. 6

Prior Art

FIG. 7

WASTE SCREENING APPARATUS

CROSS-REFERENCE TO RELATED APPLICATION

This application claims the benefit of Korea patent application No. 10-2016-0022646, filed on Feb. 25, 2016, the entire content of which is incorporated herein by reference for all purposes as if fully set forth herein.

BACKGROUND

Field of the Present Disclosure

The present disclosure relates to a waste screening apparatus, and, more particularly, to a waste screening apparatus with three-directional waste-water filtrations.

Discussion of Related Art

The wastes may block a water flow channel or cause components in a waste water treatment plant not to work. In order to remove the waste from the input water, a grid type screen has been installed in the water flow channel to filter the waste from the water to allow only the passage of the waste-removed water.

When the waste removed by the screen is not separated from the screen rapidly, the waste may be deposited on the screen to block the holes in the screen. Otherwise, the holes may allow only the passage of the waste-removed water.

Thus, the waste removed by the screen should be separated from the screen rapidly. To this end, a person may manually remove the waste from the screen using a rake. This may highly cost a human labor. Thus, the prior art approach to automatically remove the waste from the screen has been developed. The prior art approaches may be as follows by way of example.

Figure 6:
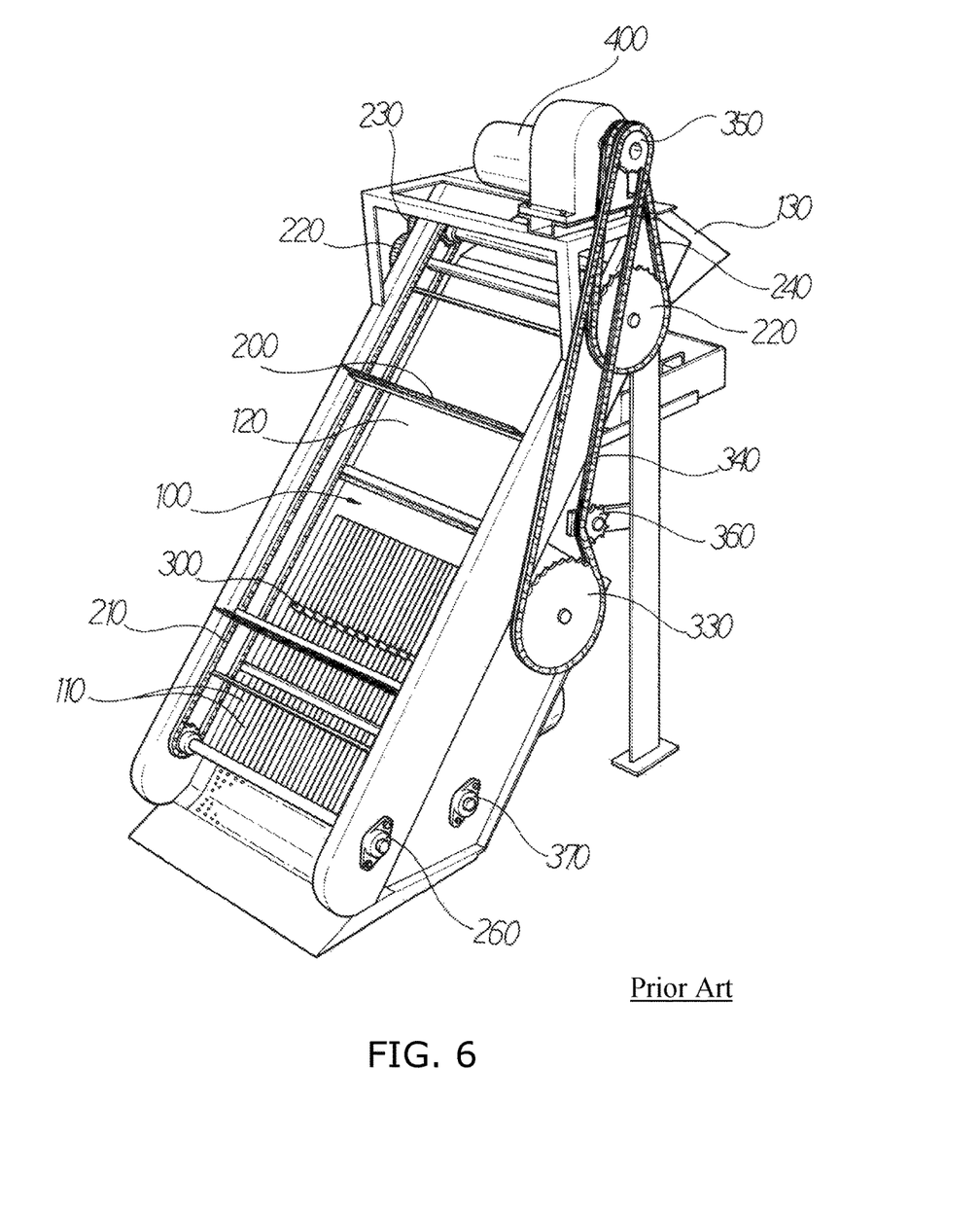
FIG. 6 is a perspective view of a waste screening apparatus in accordance with a prior art.

Korean Utility model registration No. 20-02449064 discloses a waste screening apparatus as shown in FIG. 6. In this document, the waste screening apparatus includes a main body 100; screening bars 110 arranged spacedly to allow the passage of the water; an upper plate 120 disposed above the bars 110; a motor 400; rubber-based scrapers 200 arranged spacedly and coupled to a first chain 210 rotated by the motor 400; fin scrapers 300 arranged spacedly and coupled to a second chain 310 rotated by the motor 400, wherein the fin scrapers 300 are below the screening bars 110. The motor 400 has an output shaft coupled to first and second drive chain gears 250 and 350. The rotation of the first chain gear 250 is transferred to a first gear 220 to rotate the first chain 210 to rotate the rubber-based scrapers 200. The rotation of the second chain gear 350 is transferred to a second gear 310 to rotate the second chain 310 to rotate the fin scrapers 300.

Figure 7:
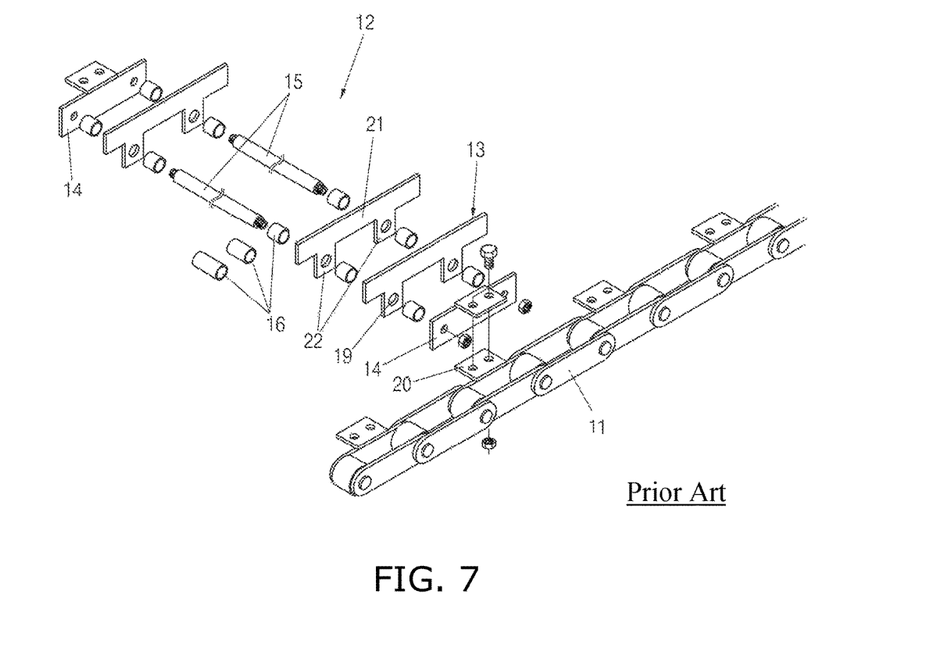
FIG. 7 is an exploded view of a waste screening apparatus in accordance with a prior art.

Korean patent No. 10-0941622 discloses a prefabricated moving screen apparatus provided to replace the screen blade in part when damaged and to regulate the whole width according to need, as shown in FIG. 7. The prefabricated moving screen apparatus comprises a motor 10, a chain 11, and a screen structure 12 for raising suspended materials. The screen structure 12 comprises screen blades 13 which are attached to the inner side of the chain 11 in the width direction and connected together by a support bar. The screen structure 12 may include an adapter 14 coupled to the chain 11; two bars 15 coupled to the adapter 14; a vertically-oriented plate 21; two legs 22 extending from the plate 21; screen blades 13, wherein the bars 15 run through the holes 19 in the legs 22 and the screen blades 13, wherein the screen blades 13 space between both-side chains 11; bushing 16 fitted with the bars 15. The screen structures 12 may be arranged along the length of the chains 11. The screen structures 12 may be coupled to the chains. The screen blades 13 may lift up wastes. The water may pass through between the plates of the screen blades 13.

In Korean Utility model registration No. 20-02449064, the automatic bar screen apparatus has shortcomings that when the scraper scrapes the waste between the screening bars, the waste may forcedly pass through between the screening bars due to a pushing pressure of the scraper. For a long-time use, the rubber-based scraper may be worn, thereby to allow the scraper not to work effectively. Further, the rubber-based scraper should be replaced frequently.

In Korean patent No. 10-0941622, the screen structure has a lot of components. Thus, an installation of the screen structure may take a considerable time. Since the bushing is inserted between the screen blades to space therebetween, the spacing between the screen blades may be enlarged. This may lower a screening function. Further, the scraper or rake is absent, and, thus, a large volume waste may not be removed. Thus, the human labor may be needed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a waste screening apparatus to overcome the above problems of the prior art approaches.

In one aspect of the present disclosure, there is provided a waste screening apparatus comprising: a main body disposed in a water flow channel in a water treatment plant, wherein the main body is vertically elongate and tilted; a waste screener vertically and tiltedly disposed in the main body to screen wastes in the input water and to allow waste-removed water to be discharged through water discharge holes defined in both side faces of the main body respectively, wherein the waste screener vertically circulates in a conveyor manner, wherein the input water is input to a front, rear and bottom of the waste screener; a driver to move the waste screener using a roller chain thereof; and a brusher disposed to substantially contact a surface of the waste screener to remove a waste from the waste screener, wherein the main body includes: both wing plates disposed at both front sides of the main body respectively, wherein the wing plates are water-tightly coupled to both inner side walls of the water flow channel to guide the input water to the waste screener; both side walls having the water discharge holes defined therein respectively to allow waste-removed water to be discharged out from the waste screener therethrough; a rear blocking wall disposed at a rear of the waste screener to be spaced from the waste screener; and a waste-discharge port disposed at a top of the main body at a rear of the rear blocking wall to allow wastes filtered by the waste screener to be discharged out therethrough, wherein the input water passes through front and rear portions of the waste screener with wastes being removed from the input water, and, then, is discharged out through the water discharge holes defined in the both side walls respectively.

In one implementation of the waste screening apparatus, gap-blocking brushes are disposed to block gaps between both side ends of the waste screener and corresponding inner side faces of the both side walls of the main body respectively.

In one implementation of the waste screening apparatus, the waste screener has an endless conveyor form, and has an inner space defined between rear and front portions thereof, wherein the waste screener is open at both sides thereof.

In one implementation of the waste screening apparatus, the waste screener includes: multiple shaft pins coupled to the roller chain, wherein the multiple shaft pins are spacedly arranged along the roller chain; multiple porous plates, each porous plate having a hinge at an vertical end thereof rotatably coupled to the corresponding shaft pin, wherein the porous plates are configured to filter the wastes contained in the input water; and multiple hooks, each hook extending horizontally from the corresponding hinge to lift up wastes contained in the input water.

In one implementation of the waste screening apparatus, the driver include: a driver motor disposed in or outside of the main body; a driver shaft horizontally axially extending along a width of the screener and disposed in a top portion of the main body, wherein both-sides first sprockets are coupled to the driver shaft at both ends thereof; a driven shaft horizontally axially extending along a width of the screener and disposed in a bottom portion of the main body, wherein both-sides second sprockets are coupled to the driven shaft at both ends thereof; and first and second roller chains coupled between the first sprockets and second sprockets respectively to circulate together with the screener.

In one implementation of the waste screening apparatus, the brusher is disposed at a rear of the waste screener and in the top portion of the main body.

In one implementation of the waste screening apparatus, the brusher includes: a brushing roller to substantially contact a surface of the waste screener to remove a waste from the waste screener; and a speed reduction motor to rotate the brushing roller.

In one implementation of the waste screening apparatus, the brushing roller has bristles, each bristle having a length larger than a length of each of the hooks.

In one implementation of the waste screening apparatus, a spacing between the rear wall of the main body and the rear portion of the waste screener is larger than a length of each of the hooks.

In accordance with the present disclosure, both the front waste screener portion and rear waste screener portion of the waste screener may be used to filter the waste-containing water. Thus, the waste filtering capacity may be increased. Further, the configuration of the screener may be simple. Thus, a maintenance thereof may have a low cost. The hinge type porous plate may be easily replaced. The hooks may effectively lift up various wastes. The brusher may effectively brush-remove the waste from the surface of the screener, to allow the screener's function to work well for a long time. Further, the porous plates of the screener may be simply disassembled or assembled. Thus, the installation of the screener may be rapid. The screener may have a low cost. The porous plate of the screener may be simply replaced when damaged.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTIONS

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

Figure 1:
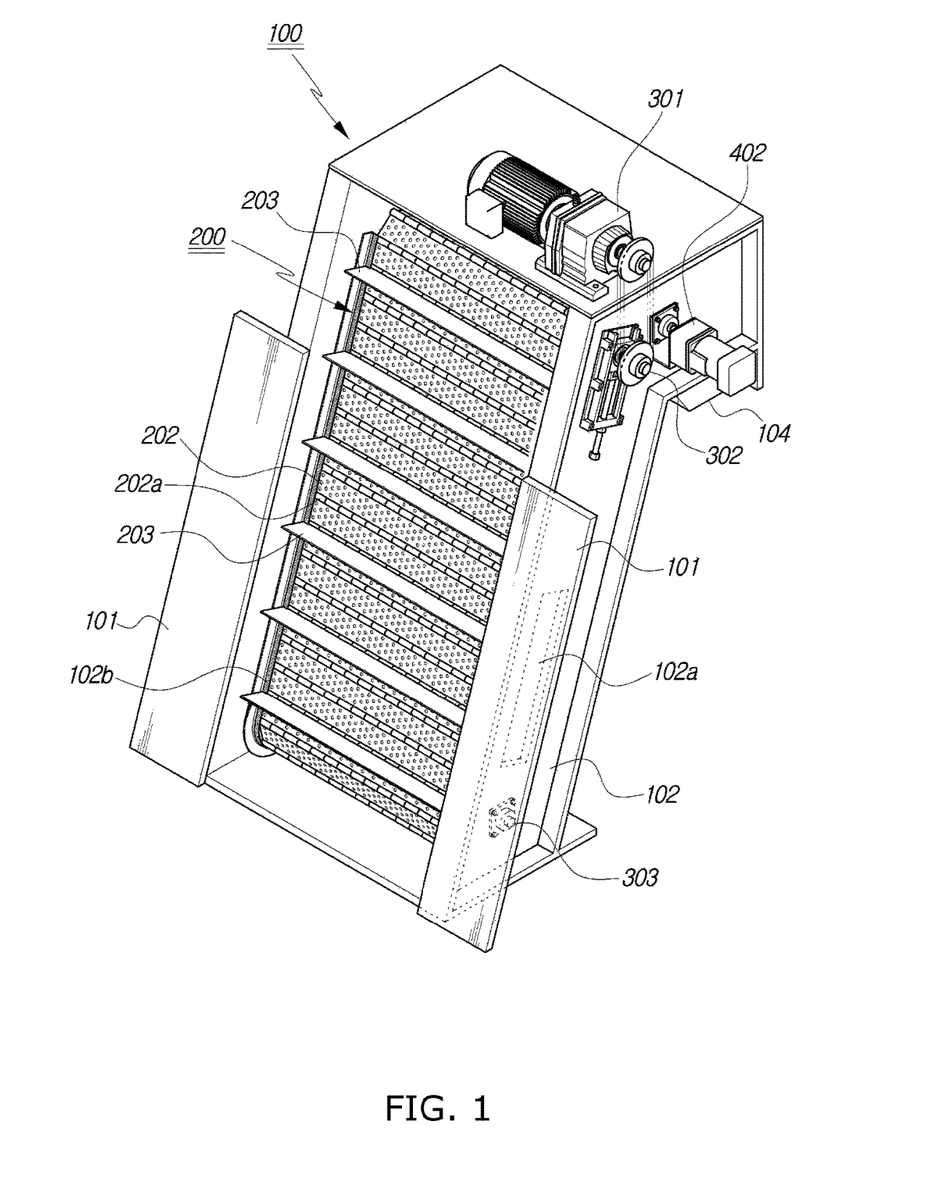
FIG. 1 is a perspective view of a waste screening apparatus in accordance with one embodiment of the present disclosure.
Figure 2:
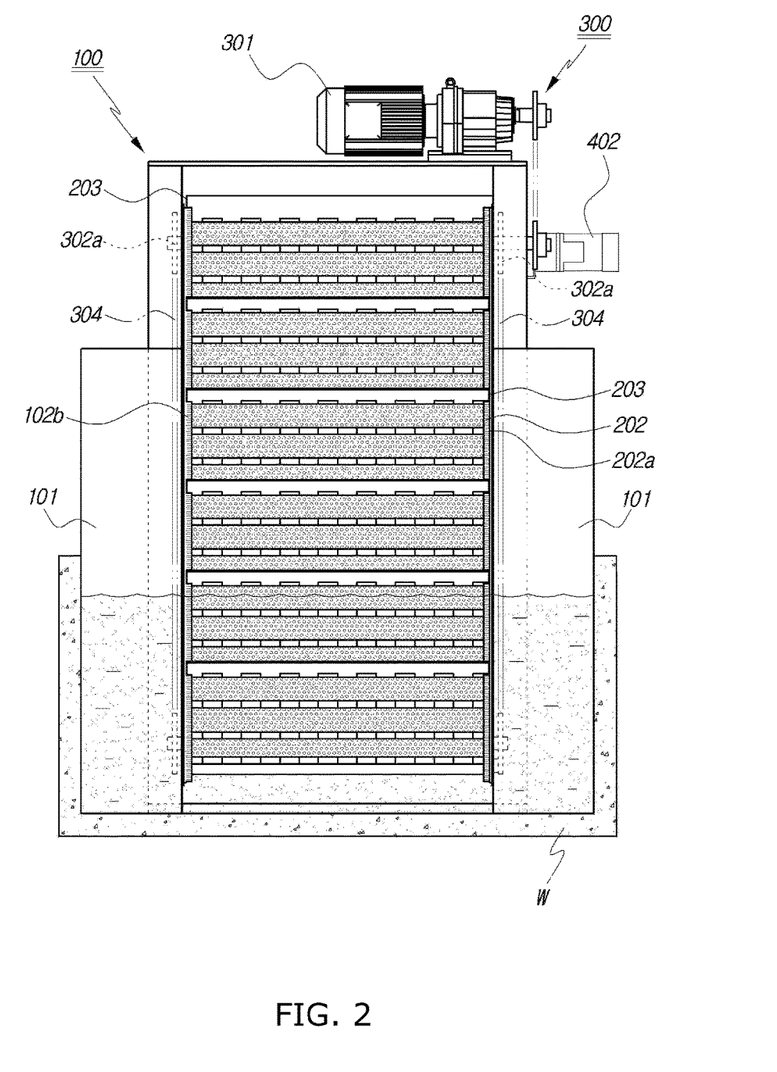
FIG. 2 is a front elevation view of a waste screening apparatus in accordance with one embodiment of the present disclosure.
Figure 3:
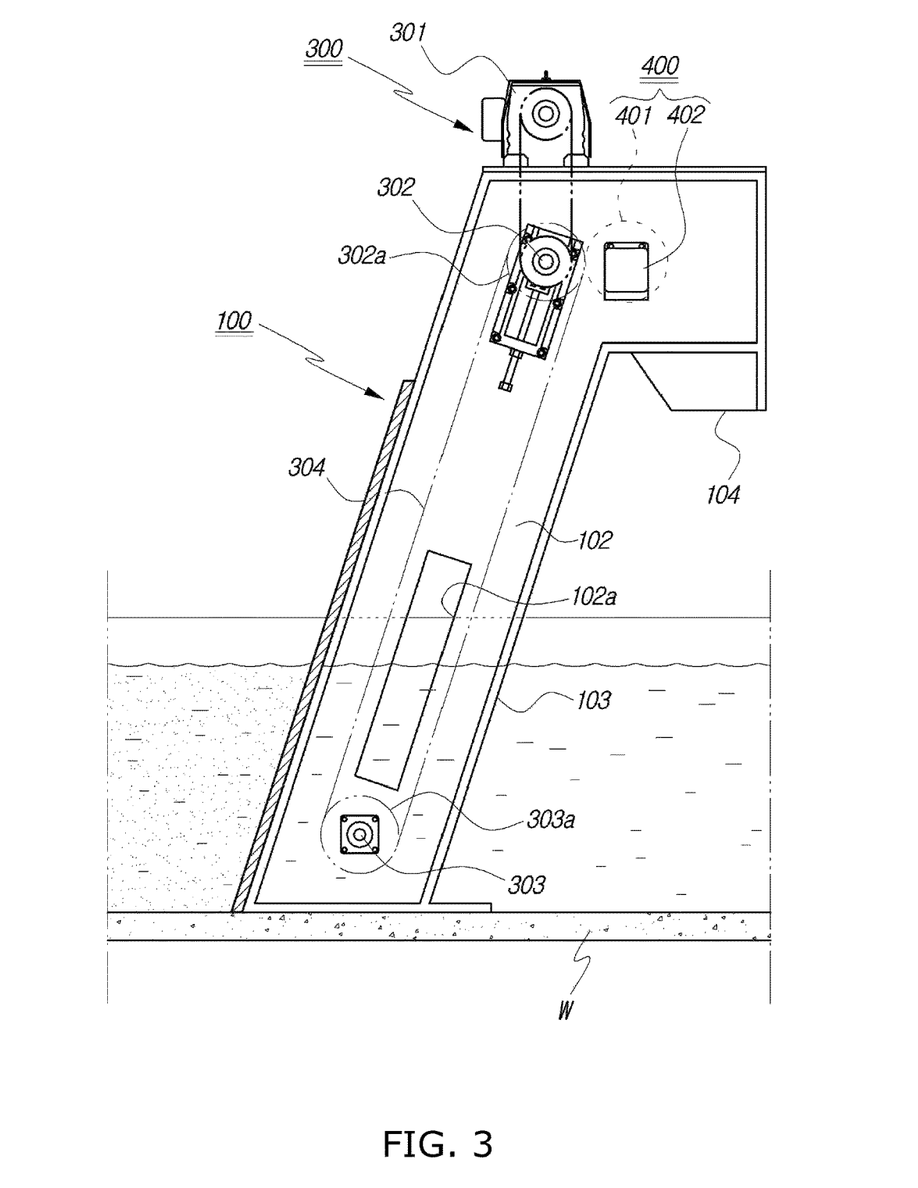
FIG. 3 is a side elevation view of a waste screening apparatus in accordance with one embodiment of the present disclosure.
Figure 4:
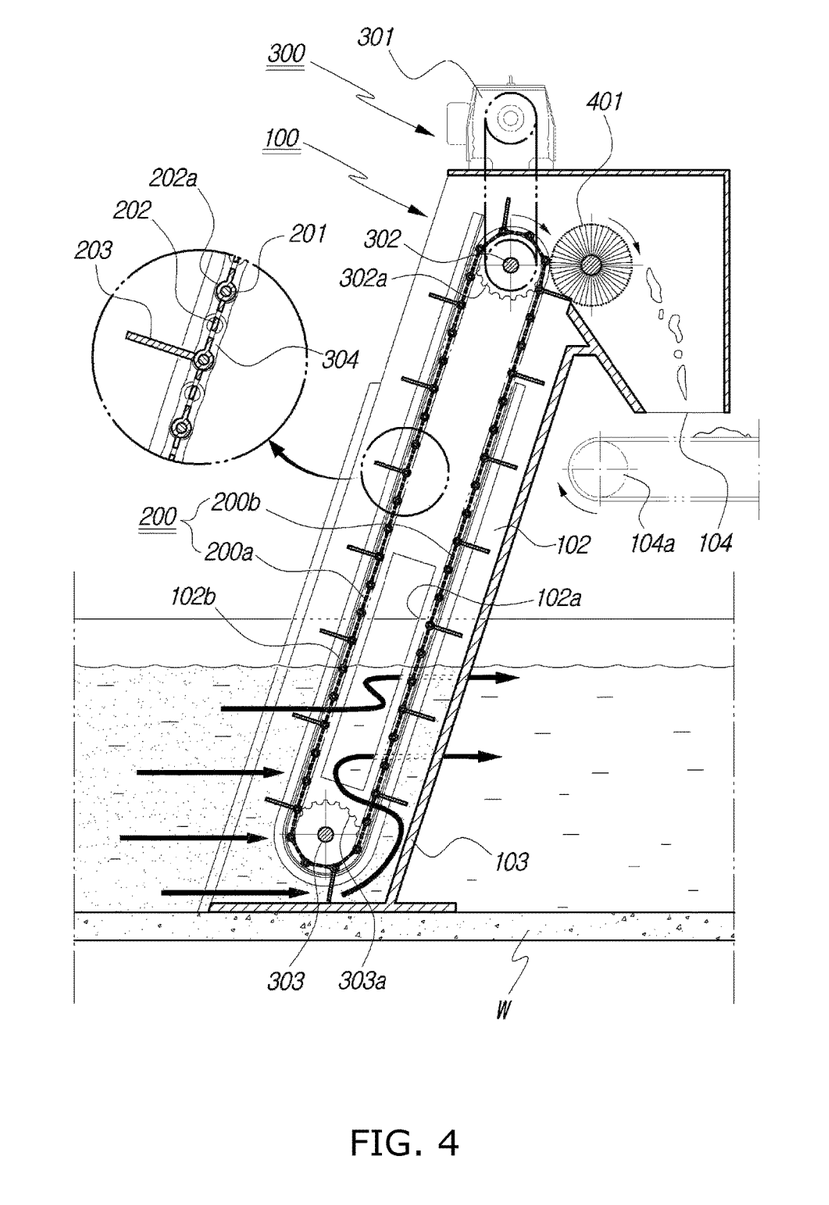
FIG. 4 is a side cross-sectional view of a waste screening apparatus in accordance with one embodiment of the present disclosure.
Figure 5:
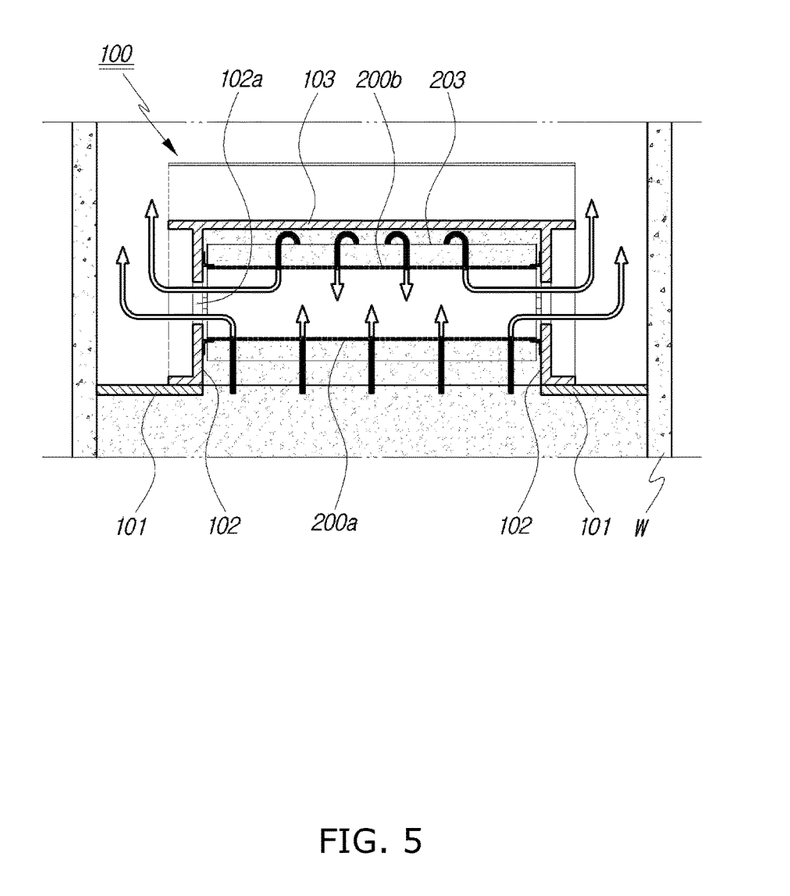
FIG. 5 is a top cross-sectional view of a waste screening apparatus in accordance with one embodiment of the present disclosure.

FIG. 1 is a perspective view of a waste screening apparatus in accordance with one embodiment of the present disclosure. FIG. 2 is a front elevation view of a waste screening apparatus in accordance with one embodiment of the present disclosure. FIG. 3 is a side elevation view of a waste screening apparatus in accordance with one embodiment of the present disclosure. FIG. 4 is a side cross-sectional view of a waste screening apparatus in accordance with one embodiment of the present disclosure. FIG. 5 is a top cross-sectional view of a waste screening apparatus in accordance with one embodiment of the present disclosure. Referring to FIG. 1 to FIG. 5, a waste screening apparatus in accordance with one embodiment of the present disclosure will be described in details.

A present waste screening apparatus may include a main body 100 disposed in a water flow channel in a water treatment plant, wherein the main body 100 is vertically elongate and tilted; a waste screener 200 vertically and tiltedly disposed in the main body 100 to screen wastes in input water and to allow waste-removed water to be discharged through water discharge holes defined in both side faces of the main body 100 respectively, wherein the waste screener 200 vertically circulates in a conveyor manner, wherein the input water is input to a front, rear and bottom of the waste screener 200; a driver 300 to move the waste screener using a roller chain 304; and a brusher 400 disposed to substantially contact a surface of the waste screener 200 to remove a waste from the waste screener 200.

The main body 100 may include both wing plates 101 disposed at both front sides of the main body 100 respectively, wherein the wing plates 101 are water-tightly coupled to both inner side walls of the water flow channel to guide the input water to the waste screener 200.

The main body 100 may include both side walls 102 having the water discharge holes 102a defined therein respectively to allow waste-removed water to be discharged out from the waste screener 200 therethrough. Gap-blocking brushes 102b may be disposed to block gaps between both sides of the waste screener 200 and corresponding inner side faces of the both side walls 102 respectively.

The main body 100 may include a rear blocking wall 103 disposed at a rear of the waste screener 200 to be spaced from the waste screener 200. The main body 100 may include a waste-discharge port 104 disposed at a top of the main body 100 at a rear of the rear blocking wall 103 to allow wastes filtered by the waste screener 200 to be discharged out therethrough.

The both wing plates 101 may be disposed at both front sides of the main body 100 respectively. The both wing plates 101 may be water-tightly coupled to the inner side walls of the water flow channel. Thus, the both wing plates 101 may prevent water containing wastes from passing through between the walls of the water flow channel and the main body of the waste screening apparatus. Instead, the both wing plates 101 may guide the water containing wastes to the waste screener 200 at a front thereof. In this way, when the main body 100 is installed in the water flow channel in the water treatment plant, the water flow channel may not have a structural change to be adapted for the main body 100.

The rear blocking wall 103 may be disposed at a rear of the waste screener 200. The rear blocking wall 103 may be spaced from the waste screener 200 to be parallel to the rear portion of the waste screener 200.

The rear blocking wall 103 may be configured such that the input water inputting to the main body 100 toward the front thereto reversely passes through a rear waste screener portion 200b of the waste screener 200 with the wastes being removed by the rear waste screener portion 200b from the water. That is, the rear blocking wall 103 may allow the input water to flow in a reverse direction opposite a forward direction and to pass through the rear waste screener portion 200b of the waste screener 200. To this end, the rear blocking wall 103 may be formed as a rear portion of the main body 100 to have a vertical height larger than a level of the input water.

The waste-discharge port 104 may be disposed at a top of the main body 100 at a rear of the rear blocking wall 103 to allow wastes filtered by the waste screener 200 to be discharged out therethrough. In order to prevent the wastes from being scattered, the waste-discharge port 104 may be closed at top and side portions thereof only except for a bottom thereof. Further, below the waste-discharge port 104, a waste conveyor 104a may be disposed to convey the wastes falling down from the waste-discharge port 104 to a waste collection location.

The both side walls 102 may be integrated with and disposed between the wing plates 101 and rear blocking wall 103 respectively. The waste-removed water from the front waste screener portion 200a and rear waste screener portion 200b of the waste screener 200 may flow into the inner space defined in the waste screener 200 between the front waste screener portion 200a and rear waste screener portion 200b. Then, the waste-removed water may be discharged out through the water discharge holes 102a defined in the both side walls of the main body between the front waste screener portion 200a and rear waste screener portion 200b. The waste screener 200 may take an endless conveyor form.

The water discharge holes 102a may allow first waste-removed water forwardly passing through the front waste screener portion 200a of the waste screener 200 and second waste-removed water reversely passing through the rear waste screener portion 200b of the waste screener 200 to be concurrently discharged out therethrough. This may increase a waste filtering capacity since the front waste screener portion 200a and rear waste screener portion 200b of the waste screener 200 are concurrently used to filter the wastes.

Further, the gap-blocking brushes 102b may be disposed to block gaps between both sides of the waste screener 200 and corresponding inner side faces of the both side walls 102 respectively. Thus, various wastes contained in the input water may be prevented from passing through the gaps between both sides of the waste screener 200 and corresponding inner side faces of the both side walls 102 respectively and then being discharged out through the water discharge holes 102a without being filtered out by the waste screener 200.

The waste screener 200 may have an endless conveyor form. The waste screener 200 may have an inner space defined between the rear and front portions thereof. The waste screener 200 may be open at both sides thereof. The waste screener 200 may extend vertically and tiltedly. The waste screener 200 may circulate in an endless manner. The waste screener 200 may filter wastes contained in the input water flowing toward a front of the main body 100. The waste-removed water may pass through the open both sides of the screener 200.

The waste screener 200 may include multiple shaft pins 201 coupled to the roller chain 304 wherein the multiple shaft pins 201 are spacedly arranged along the roller chain 304; multiple porous plates 202, each porous plate having a hinge 202a at an vertical end thereof rotatably coupled to the corresponding shaft pin 201, wherein the porous plates 202 are configured to filter the wastes contained in the input water; and multiple hooks 203, each hook extending hori- zontally from the corresponding hinge 202a to lift up the wastes contained in the input water.

The multiple shaft pins 201 each may extend horizontally to connect both side roller chains 304 on both inner side faces of the side walls 102 of the main body 100 respectively. The multiple shaft pins 201 may be arranged at a predetermined spacing therebetween. Each of the porous plates 202 may be coupled to each of the multiple shaft pins 201 via each of the hinges 202a. Thus, the porous plates 202 may be coupled to one another in a conveyor manner. The porous plates 202 may be moved using the roller chain 304.

The porous plates 202 may be water-tightly coupled to the multiple shaft pins 201 via the hinges 202a thereof respectively. Thus, the waste may not be inserted into the hinges 202a. When the porous plates 202 coupled to one another in a conveyor manner are circulated using the roller chain 304, the plates may not be spaced from each other at portions of the plates 202 having direction-changes. Thus, the waste may not be fitted with the plates 202. When a certain porous plate 202 among the porous plates 202 is damaged, only the damaged porous plates 202 may be replaced with new one.

Each of the porous plates 202 may have fine holes defined therein as shown in FIG. 1 to allow the passage of the water but to disallow the passage of the waste. The diameter of each hole defined in the plate 202 may depend on types or sizes or shapes of the wastes contained in the input water into the water flow channel in the water treatment plant where the present waste screening apparatus is installed.

Each of the hooks 203 may protrude horizontally from each of the hinges 202a of the porous plates 202. When the porous plates 202 are moved using the driver 300, the hooks 203 may lift up the various wastes removed from the input water. Further, the hooks 203 may lift up various settlements on the bottom of the main body 100 such as sludge, rocks, sands, soils, etc. thereby to prevent the bottom of the waste screener 200 from being blocked by the settlements. Thus, the input water may passes through the bottom of the screener 200.

Each of the hooks 203 may extend along a width of each of the porous plates 202. Each hook 203 may have a plate shape as shown in FIG. 1. However, the present disclosure may not be limited thereto. Each hook 203 may have a cup shape or rake shape.

The driver 300 may be configured to circulate the waste screener 200 using the roller chains 304. The driver 300 may include a driver motor 301 disposed, for example, over the top portion of the main body 100; a driver shaft 302 horizontally axially extending along a width of the screener 200 and disposed, for example, in the top portion of the main body 100, wherein both-sides first sprockets 302a are coupled to the shaft 302 at both ends thereof; a driven shaft 303 horizontally axially extending along a width of the screener 200 and disposed, for example, in the bottom portion of the main body 100, wherein both-sides second sprockets 303a are coupled to the shaft 303 at both ends thereof; and a roller chain 304 coupled between the first sprocket 302a and second sprocket 303a to circulate together with the screener 200.

The driver motor 301 may supply the rotation force via a belt to the driver shaft 302, which, in turn, transfers the rotation force to both-sides first sprockets 302a, which, in turn, transfer the rotation force to both-sides roller chains 304, which, in turn, transfer the rotation force to the driven shaft 303 via the second sprockets 303a respectively. For this, the both-sides roller chains 304 may be coupled to and between the first sprockets 302a and second sprockets 303a respectively. In this way, the driver motor 301 may be configured to rotate the roller chains 304 and, thus, the waste screener 200.

The brusher 400 may be disposed to substantially contact a surface of the waste screener 200 to remove a waste from the waste screener 200. The brusher 400 may be disposed at a rear of the waste screener 200 and in the top portion of the main body 100. The brusher 400 may include a brushing roller 401 to substantially contact a surface of the waste screener 200 to remove a waste from the waste screener 200; and a speed reduction motor 402 outside of the main body 100 to rotate the brushing roller 401.

The brushing roller 401 may have bristles, each bristle having a length larger than a length of each of the hooks 203 protruding from the porous plates 202 of the waste screener 200. Thus, when the waste screener 200 is driven, and the brushing roller 401 rotates to remove the wastes from the surface of the waste screener 200, interference between the hooks 203 and the brushing roller 401 may be suppressed.

Hereinafter, the operation of the present waste screening apparatus may be as follows.

The present waste screening apparatus may be installed in a water flow channel W in a water pumping plant such as an edible water pumping or relay water pumping or water discharge pumping plant, or a water treatment plant such as a sewage treatment plant, waste water treatment plant, etc. The present waste screening apparatus may filter or screen the wastes from the input water thereto and discharge the removed wastes out of the water flow channel and allow the waste-removed water to flow through the water flow channel.

The main body 100 may have the wing plates 101 water-tightly coupled to the inner side faces of the water flow channel. In this way, the main body 100 may be installed in the water flow channel W. The input water containing the wastes may be input through the water flow channel to the main body 100 and to the waste screener 200. The driver 300 may rotate the waste screener 200 to remove the wastes from the input water flowing in front, rear and bottom directions thereof thereto, while the waste screener 200 allows the passage of the waste-removed water. The waste screener 200 may lift up the wastes and discharge the wastes out of the water flow channel.

The waste-removed water may pass through the holes defined in the porous plates 202 of the waste screener 200 and to the inner space defined between the front and rear portions of the waste screener 200 and then through the water discharge holes 102*a* defined in the side walls 102 of the main body 100 and, finally, may be discharged out of the present apparatus. In this way, the waste screener 200 may filter the input water.

At the same time, the brusher 400 disposed at a rear of the waste screener 200 may remove the wastes deposited on the surface of the waste screener 200 therefrom. The brusher 400 may discharge the waste through the waste discharge port 104 to a waste conveyor 104*a* which may transfer the waste to the waste collection location. In this way, the brusher 400 may clean the waste screener 200. Thus, the holes defined in the plates 202 of the waste screener 200 may be prevented from being blocked with the wastes.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A waste screening apparatus comprising:
   a main body disposed in a water flow channel in a water treatment plant, wherein the main body is vertically elongate and tilted;
   a waste screener vertically and tiltedly disposed in the main body to screen wastes in input water and to allow waste-removed water to be discharged through water discharge holes of the main body, wherein the waste screener vertically circulates in a conveyor manner, wherein the input water is input to a front, rear and bottom of the waste screener;
   a driver to move the waste screener using a roller chain thereof; and
   a brusher disposed to substantially contact a surface of the waste screener to remove a waste from the waste screener,
   wherein the main body includes:
   left and right wing plates disposed at left and right front sides of the main body respectively, wherein the left and right wing plates are water-tightly coupled to left and right inner side walls of the water flow channel, respectively, to guide the input water to the waste screener;
   left and right side walls having the water discharge holes defined therein respectively to allow waste-removed water to be discharged out from the waste screener therethrough;
   a rear blocking wall disposed at a rear of the waste screener to be spaced from the waste screener; and
   a waste-discharge port disposed at a top of the main body at a rear of the rear blocking wall to allow wastes filtered by the waste screener to be discharged out therethrough,
   wherein the input water passes through front and rear portions of the waste screener with wastes being removed from the input water, and, then, is discharged out through the water discharge holes defined in the left and right side walls respectively.

2. The waste screening apparatus of claim 1, wherein gap-blocking brushes are disposed to block gaps between left and right side ends of the waste screener and corresponding inner side faces of the left and right side walls of the main body respectively.

3. The waste screening apparatus of claim 1, wherein the waste screener has an endless conveyor form, and has an inner space defined between rear and front portions thereof, wherein the waste screener is open at left and right sides thereof.

4. The waste screening apparatus of claim 3, wherein the driver include: a driver motor disposed in or outside of the main body;
   a driver shaft horizontally axially extending along a width of the screener and disposed in a top portion of the main body, wherein left and right sides first sprockets are coupled to the driver shaft at left and right ends thereof, respectively; a driven shaft horizontally axially extending along a width of the screener and disposed in a bottom portion of the main body, wherein left and right sides second sprockets are coupled to the driven shaft at left and right ends thereof, respectively; and first and second roller chains coupled between the first sprockets and second sprockets respectively to circulate together with the screener.

5. The waste screening apparatus of claim 4, wherein a spacing between the rear blocking wall of the main body and the rear portion of the waste screener is larger than a length of each of the hooks.

6. The waste screening apparatus of claim 1, wherein the waste screener includes:

multiple shaft pins coupled to the roller chain, wherein the multiple shaft pins are spacedly arranged along the roller chain;

multiple porous plates, each porous plate having a hinge at a vertical end thereof rotatably coupled to the corresponding shaft pin, wherein the porous plates are configured to filter the wastes contained in the input water; and multiple hooks, each hook extending horizontally from the corresponding hinge to lift up wastes contained in the input water.

7. The waste screening apparatus of claim 6, wherein the brusher includes:

a brushing roller to substantially contact a surface of the waste screener to remove a waste from the waste screener; and a speed reduction motor to rotate the brushing roller, wherein the brushing roller has bristles, each bristle having a length larger than a length of each of the hooks.

8. The waste screening apparatus of claim 1, wherein the driver include: a driver motor disposed in or outside of the main body;

a driver shaft horizontally axially extending along a width of the screener and disposed in a top portion of the main body, wherein left and right sides first sprockets are coupled to the driver shaft at left and right ends thereof, respectively; a driven shaft horizontally axially extending along a width of the screener and disposed in a bottom portion of the main body, wherein left and right sides second sprockets are coupled to the driven shaft at left and right ends thereof, respectively; and first and second roller chains coupled between the first sprockets and second sprockets respectively to circulate together with the screener.

9. The waste screening apparatus of claim 1, wherein the brusher is disposed at a rear of the waste screener and in the top portion of the main body.

10. The waste screening apparatus of claim 1, wherein the brusher includes:

a brushing roller to substantially contact a surface of the waste screener to remove a waste from the waste screener; and a speed reduction motor to rotate the brushing roller.

11. The waste screening apparatus of claim 1, wherein the gap-blocking brushes are disposed to block gaps between left and right side ends of the waste screener and corresponding inner side faces of the left and right side walls of the main body respectively, wherein the waste screener has an endless conveyor form, and has an inner space defined between rear and front portions thereof, wherein the waste screener is open at left and right sides thereof, wherein the waste screener includes:

multiple shaft pins coupled to the roller chain, wherein the multiple shaft pins are spacedly arranged along the roller chain;

multiple porous plates, each porous plate having a hinge at a vertical end thereof rotatably coupled to the corresponding shaft pin, wherein the porous plates are configured to filter the wastes contained in the input water; and multiple hooks, each hook extending horizontally from the corresponding hinge to lift up wastes contained in the input water.

* * * * *